United States Patent [19]
Saeki

[11] Patent Number: 5,848,725
[45] Date of Patent: Dec. 15, 1998

[54] PICKING APPARATUS

[75] Inventor: Yutaka Saeki, Kakogawa, Japan

[73] Assignee: Okura Yusoki Kabushiki Kaisha, Japan

[21] Appl. No.: 698,561

[22] Filed: Aug. 15, 1996

[51] Int. Cl.$^6$ ................................................ B65G 59/00
[52] U.S. Cl. ............................................. 221/131; 221/266
[58] Field of Search ................................. 221/131, 123, 221/124, 92, 277, 266, 263, 241, 2, 7, 13, 9, 15

[56] References Cited

U.S. PATENT DOCUMENTS

| | | | |
|---|---|---|---|
| 4,013,192 | 3/1977 | Pillon | 221/7 |
| 5,097,982 | 3/1992 | Kedem et al. | 221/131 |
| 5,176,288 | 1/1993 | Craven | 221/131 |
| 5,651,476 | 7/1997 | Percy et al. | 221/131 |

*Primary Examiner*—Kenneth Noland
*Attorney, Agent, or Firm*—Morrison Law Firm

[57] ABSTRACT

A picking apparatus which is capable of automatic retrieval of a selected number and kinds of cylindrical objects from stocks of such objects includes a plurality of storage sections arranged side-by-side, each storage section containing a different kind or type of cylindrical object. A discharge means is provided at a lower part of each storage section in order to discharge cylindrical objects one at a time from the storage section. A conveyor extends along the course of the storage sections and conveys discharged objects to a single location. A control unit is provided to control the discharge means of the respective storage sections so that the necessary number and kinds of cylindrical objects are retrieved therefrom.

5 Claims, 8 Drawing Sheets

PICKING APPARATUS

BACKGROUND OF THE INVENTION

The present invention relates to apparatus for retrieving or picking cylindrical objects and more particularly, to apparatus for retrieving rolls of coins from a stock thereof.

In many business facilities, for example, a supermarket, it is a common practice before opening for business each day to supply each cash register with a quantity of coins for making change during sales transactions. Coins for this purpose normally are supplied in the form of cylindrical coin rolls, which can, e.g., consist of packages of 50 coins of selected and various denominations. The coin rolls can represent 1 yen coin packages, 5 yen coin packages etc.

When supplying coin rolls to each register, an operator typically removes a number and denominations of coin rolls necessary for each register by hand from money box stocks of such. He the places the removed coin rolls in sacks or other containers for transport of the coin rolls to the respective register stations.

This conventional procedure for selecting the coins and particularly where many register stations are to be supplied, can be inefficient and burdensome.

To overcome the above disadvantages it is desirable that apparatus be provided to make possible such coin retrieval and delivery to required sites more efficiently than heretofore practiced.

OBJECTS AND SUMMARY OF THE INVENTION

Accordingly, it is an object of the invention to provide apparatus for retrieving or picking cylindrical objects such as coin rolls from a stock of such which overcomes the drawbacks of the prior art.

It is a further object of the invention to provide apparatus for retrieving or picking cylindrical objects in which such objects can be picked from plural stocks of cylindrical objects wherein the objects in each stock are discrete from the articles in each other of the stocks.

It is a still further object of the invention to provide apparatus for retrieving or picking cylindrical objects from plural stocks thereof which can be automatically effected with operation of a control unit controlling operation of retrieval or picking function.

In accordance with the invention, the picking apparatus comprises a plurality of hopper-shaped storage sections, which are arranged side by side and respectively contain different kinds of cylindrical objects; discharge means provided at the lower part of the respective storage sections, each discharge means discharging cylindrical objects from the corresponding storage section one at a time; a conveyor which extends along the row of the storage sections and conveys cylindrical objects discharged from the storage sections by the discharge means to a single location; and a control unit which controls the discharge means of the storage sections, thereby causing a selected number and kinds of cylindrical objects to be discharged from the storage section.

The apparatus operates the discharge means of each storage section which contains cylindrical objects for a selected picking cycle to discharge one object at a time the necessary number of objects from each storage section. The cylindrical objects discharged from the respective storage sections fall onto the conveyor, which carries these objects to a single station.

In the picking apparatus, each storage section is provided with a delivery port for permitting cylindrical objects to move therethrough to the discharge means, the delivery port being located at the bottom of the storage section, and each storage section is also provided with a vibrating member and a vibrating means.

The vibrating member is disposed at an end of the delivery port in such manner as to be capable of extending into and retracting from the storage section, with the vibrating means transmitting vibrations to the vibrating member so that the vibrating member in its extension and retraction movements shakes the cylindrical objects in the storage section to prevent the cylindrical objects from bridging or otherwise becoming stuck in the storage section in manner as prevents delivery of the objects to the delivery port.

In the picking apparatus, a roller member is provided above each delivery port, more specifically above the end opposite the end where the vibrating member is disposed, the roller member being disposed in such manner as to project into the storage section wherein it is positioned to facilitate smooth downward passage of coin rolls to the delivery port.

The construction provides that when cylindrical objects contained in each storage section move down towards the delivery port following discharge of an object by the discharge means toward a chute, the roller member produces coin roll movement in a fore-and-aft direction against the coin roll stock to further contribute to assured downward movement of same.

Briefly stated, there is provided picking apparatus which is capable of automatic retrieval of a selected number and kinds of cylindrical objects from stocks of such objects. The apparatus includes a plurality of storage sections arranged side-by-side, each storage section containing a different kind or type of cylindrical object. A discharge means is provided at a lower part of each storage section in order to discharge cylindrical objects one at a time from the storage section. A conveyor extends along the course of the storage sections and conveys discharged objects to a single location. A control unit is provided to control the discharge means of the respective storage sections so that the necessary number and kinds of cylindrical objects are retrieved therefrom.

In accordance with these and other objects of the invention, there is provided apparatus for retrieving cylindrically configured objects from a plurality of side by side arrayed hopper-shaped storage sections, each storage section containing cylindrical objects of an object denomination different than an object denomination of the cylindrical objects contained in any other of the storage sections. The apparatus comprises separate discharge means associated with each storage section for discharging cylindrical objects from said each storage section. The discharge means each are located at a lower part of an associated storage section and is operable to discharge cylindrical objects from its said associated storage section one at a time. A conveyor extends along the array of storage sections adjacent the discharge means of each of said storage sections and is operable to receive cylindrical objects discharged thereon for conveying said discharged cylindrical objects to a common location. A control unit is provided for controlling operation of respective ones of the discharge means for effecting discharge of a predetermined number of cylindrical objects in predetermined denominations from said storage sections onto the conveyor.

The above, and other objects, features and advantages of the present invention will become apparent from the fol-

DETAILED DESCRIPTION OF THE PREFERRED EMBODIMENT

The present invention is described herein in respect of its use for retrieving cylindrical rolls of coins from stocks thereof. It should be understood though that it has applicability for retrieving cylindrical objects of other description or denomination. "Denomination" as used herein means characteristics of cylindrical objects that differentiates them from others of cylindrical objects in regard to such considerations as weight, length, diameter, value and like characteristics. Cylindrical objects to which the invention is applicable, in addition to rolled coin packages, are studs, rod pieces etc.

The disclosed embodiment is particularly suited for retrieving or picking coin rolls from coin roll stocks. Generally the coin rolls will comprise 50 coins to a roll and the denominations of coins will vary in accordance with end purpose. For example in supermarket use in Japan, coin roll stocks in denominations of 1, 5, 50, 100 and 500 yen can be involved. Further and as will be apparent from later reading hereof, the various denomination stocks can have sequential ascending or descending denominational value along a picking line.

Figure 1:
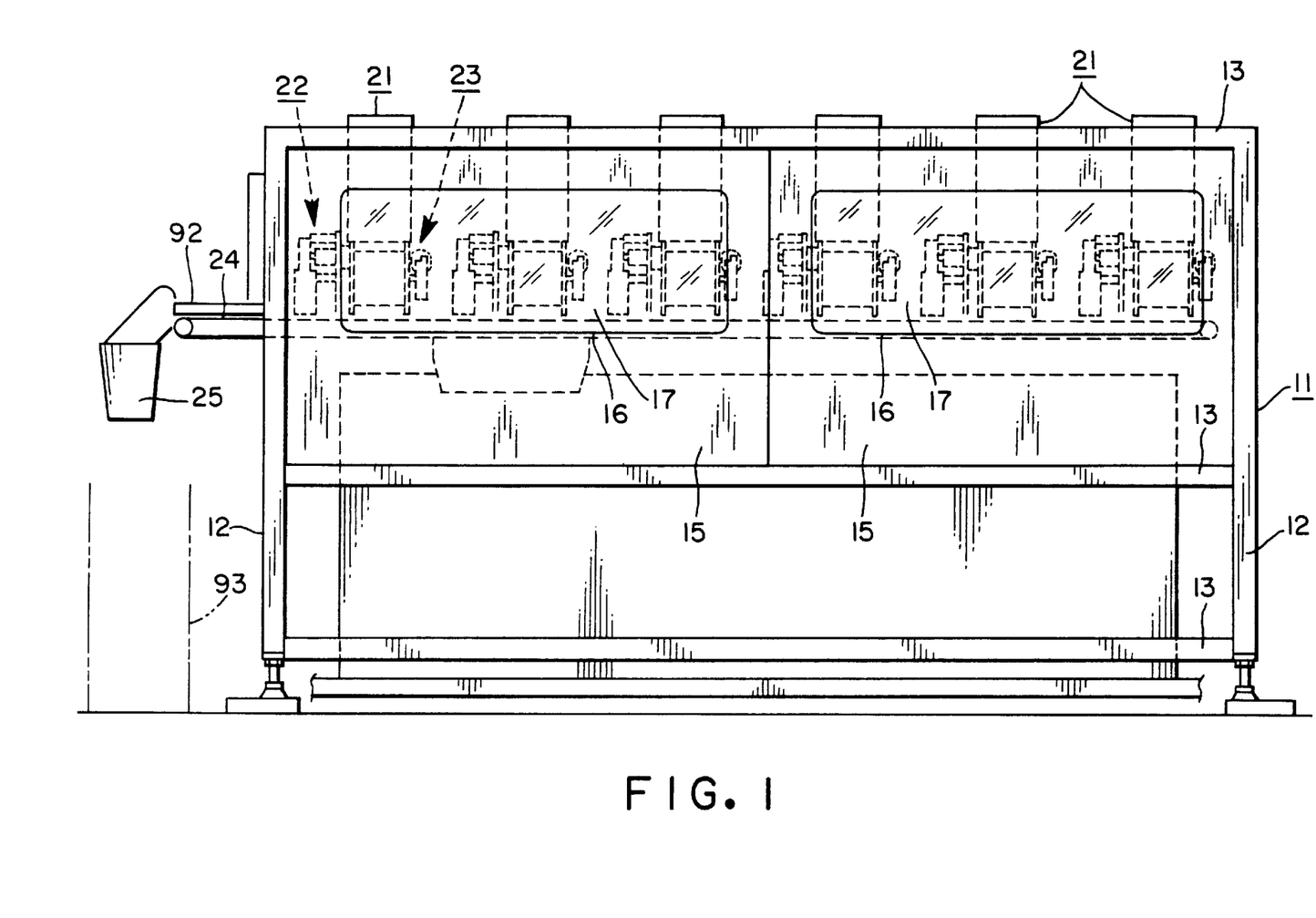
FIG. 1 is a front elevational view of an embodiment of the retrieval or picking apparatus made in accordance with the invention.
Figure 2:
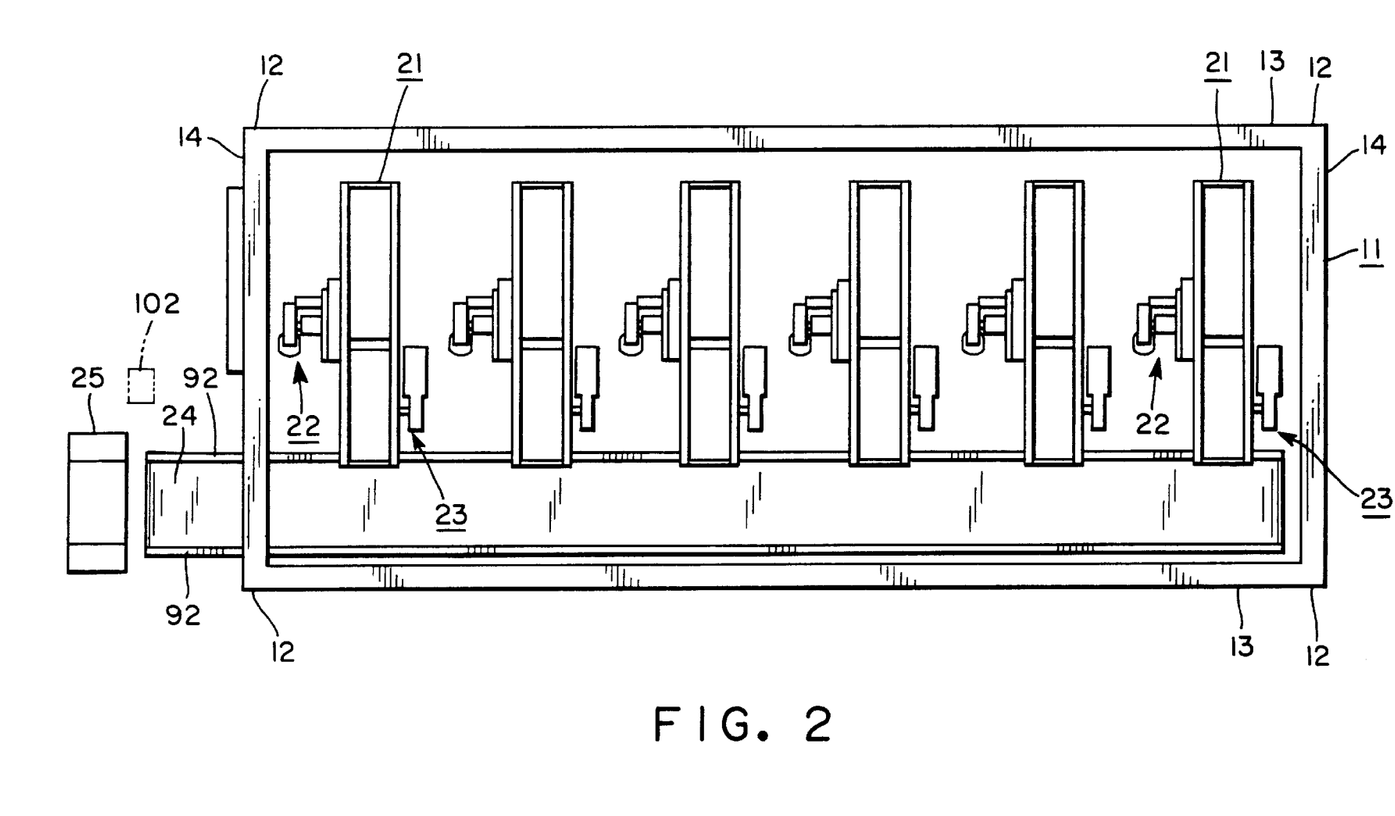
FIG. 2 is a top plan view of the picking apparatus.
Figure 3:
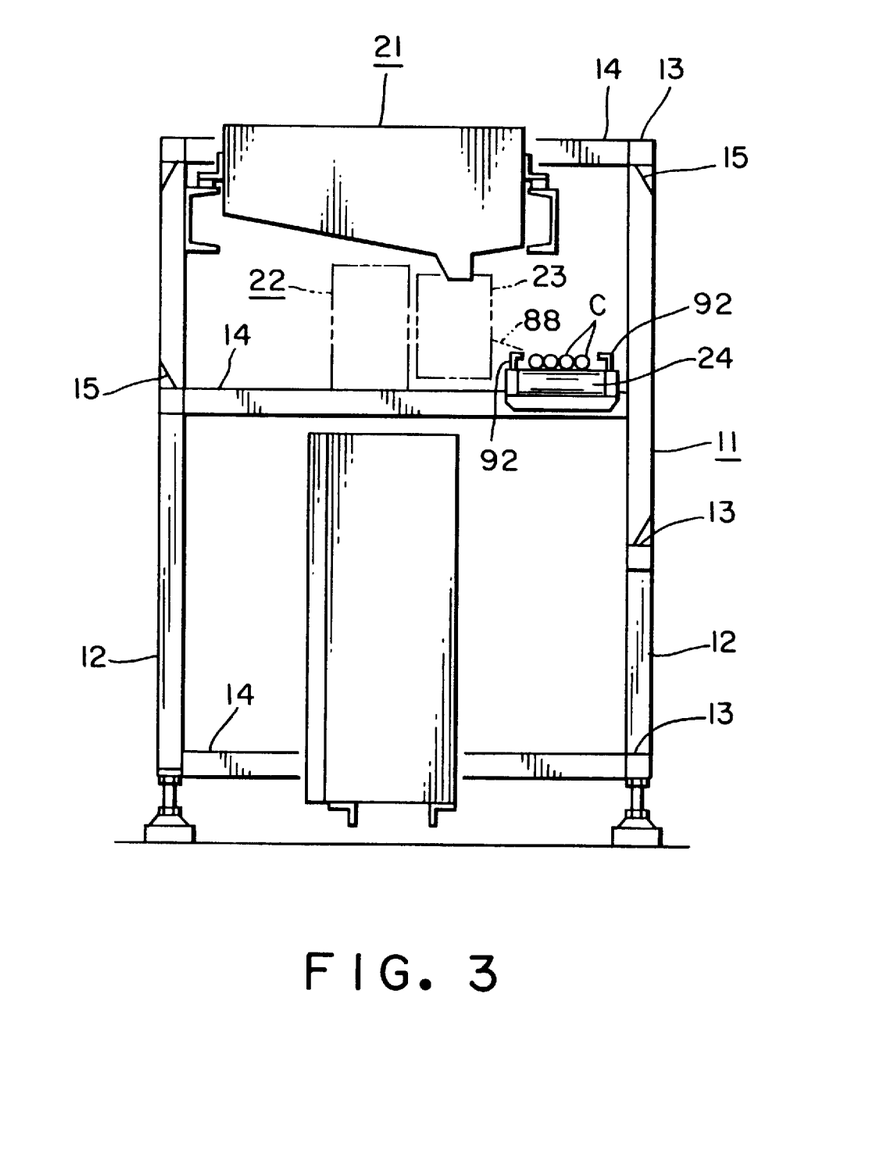
FIG. 3 is a transverse view in elevation of the picking apparatus as viewed from a left side of the apparatus.

Referring now to FIGS. 1—3, it is seen that the picking apparatus includes a main frame 11 which has four legs 12. Legs 12 are joined together at their upper, middle and lower parts by means of stringer pieces 13, 14, of which lengthwise stringers 13 are longer than side stringers 14 and extend in a lateral direction, and side stringers 14 extending in a fore-and-aft direction. Covers 15 are provided between each upper and middle lengthwise stringers 13 as well as between each upper and middle side stringer 14. Each front cover 15 is provided with a window 16 to which a transparent panel 17 is attached.

Provided at the upper part of main frame 11 are a plurality of storage sections or bins 21 for stocking rolls of coins C, the successive ones of the bins being associated with successive ones of coin denominations in sequence as discussed above, e.g., leftmost bin stocking 500 yen coin rolls with the next bin being 100 yen coil rolls etc.

A vibrating means shown generally at 22 is provided for ensuring proper discharge of a coin roll C in each storage section 21, and a discharge means shown generally at 23 is provided for discharging coin rolls one at a time from the storage section 21, there being a latter such means located at a lower part of each storage section 21.

A conveyor 24 extends in the lateral direction below the front end of the discharge means 23 of each storage section 21 in order to carry coin rolls C discharged from storage sections 21 by their respective discharge means 23 in the conveying direction, i.e., to the left when viewed from the front of the apparatus. The left end of the conveying path of conveyor 24 projects from main frame 11, and a receiving section 25 for receiving coin rolls C delivered by conveyor 24 is provided at the end of conveyor 24.

Figure 4:
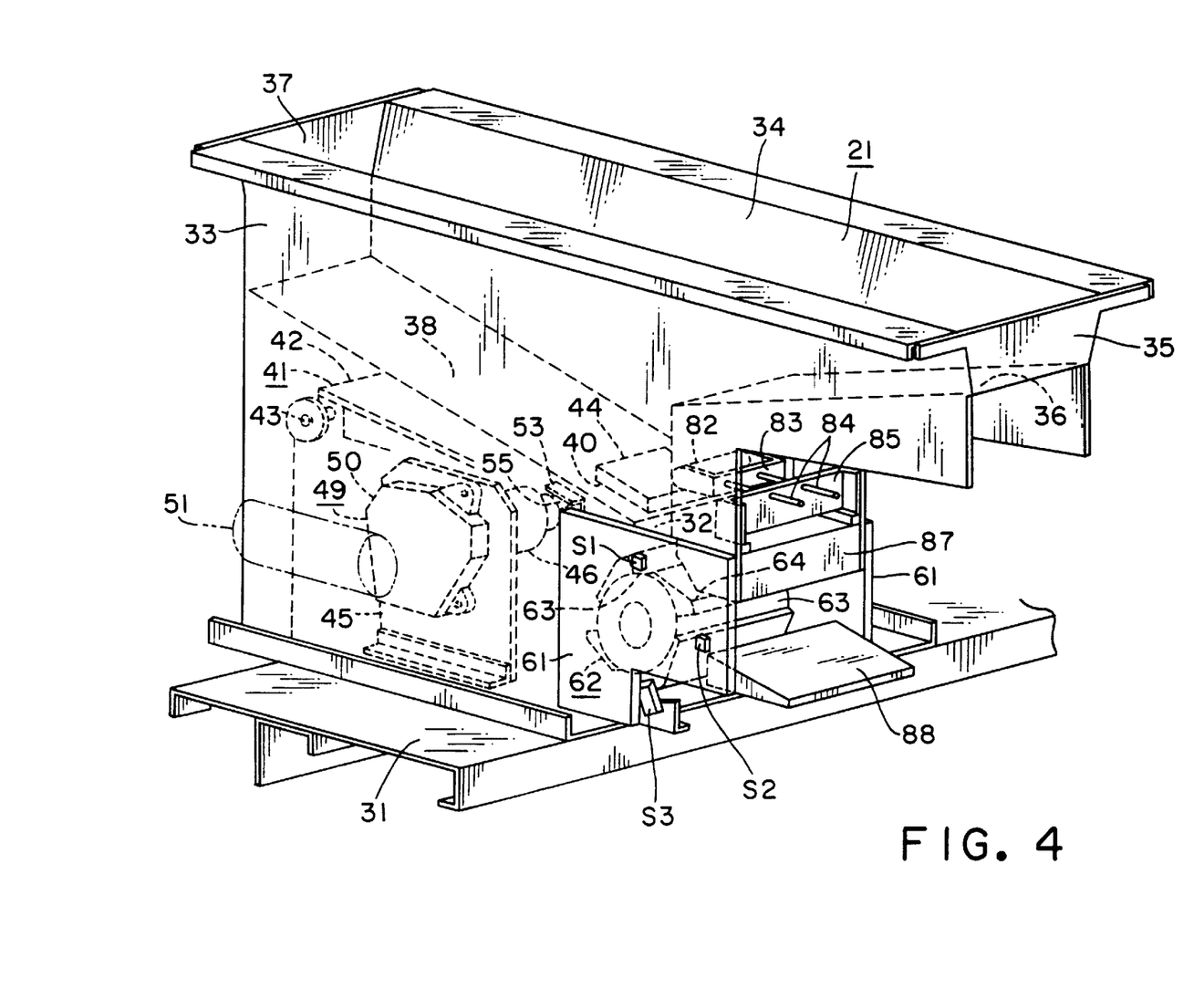
FIG. 4 is a perspective view of a storage section of the picking apparatus.
Figure 5:
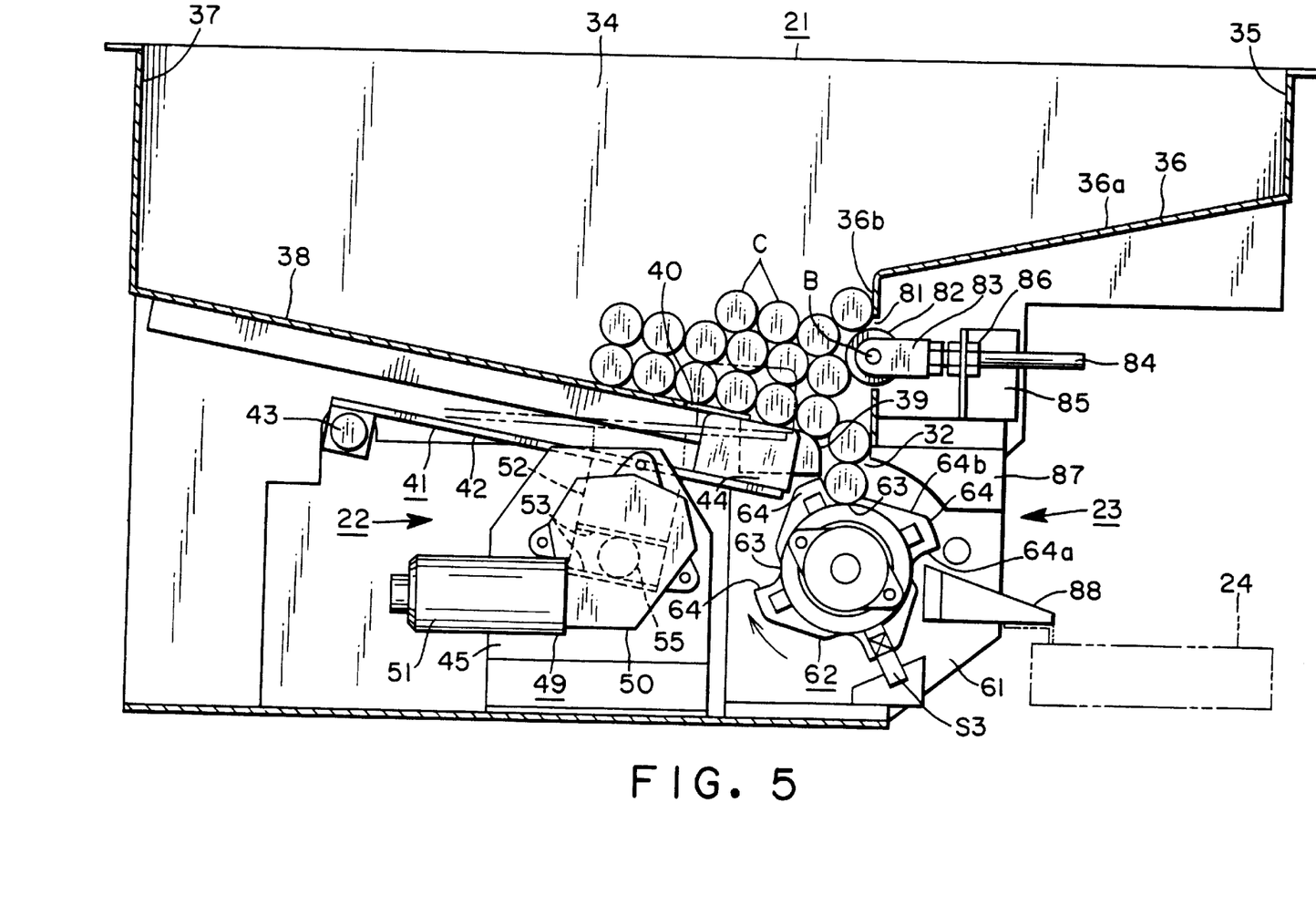
FIG. 5 is a side sectional view of the storage section depicted in FIG. 4.
Figure 6:
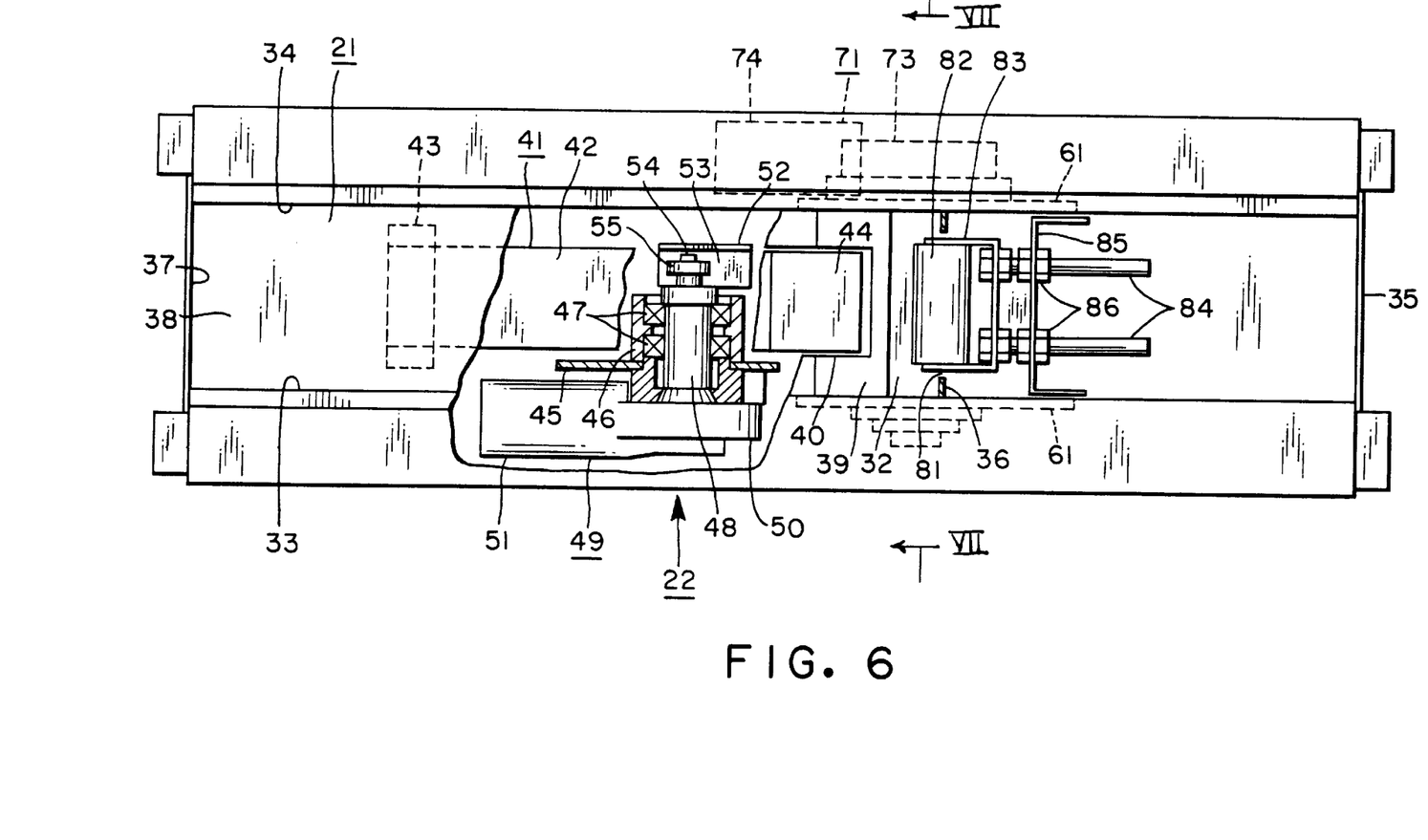
FIG. 6 is a top plan view of the storage section, some parts being broken away for sake of clarity of depiction.

FIGS. 4—6 detail features of each storage section 21. A frame unit 31 is attached to main frame 11 in such a manner as to extend laterally, in other words along the length of the frame 11. The storage sections 21 are formed in the shape of a rectangular box elongated in the fore-and-aft direction and are mounted on frame unit 31. A plurality of coin rolls C can be stocked in each storage section 21, with the length of the coin rolls parallel to the width of storage section 21. Further, storage section 21 is open at the top and provided with a delivery port 32 near its lower front end.

Each storage section 21 has side plates 33, 34 erected respectively at the left and right sides on frame unit 31 and formed in the shape of a hopper, this hopper having a front plate 35, a guide plate 36, a rear plate 37 and a bottom plate 38 extending between side plates 33, 34. Storage section 21 is also provided with an opening and a delivery port 32, which are respectively formed at the top of the storage section and between guide plate 36 and bottom plate 38.

Guide plate 36 has an inclined surface 36a at the top in order to direct coin rolls C towards delivery port 32. The rear end of inclined face 36a is integrally formed with a vertical face 36b, whose lower end constitutes the front edge of delivery port 32.

Bottom plate 38 is inclined as shown so as to direct coin rolls C towards delivery port 32, there being a guide plate 39 attached to a lower surface part of the end of bottom plate 38. The front end of guide plate 39 is bent downward and serves as the rear end of delivery port 32. A cut out portion 40 is formed at the fore end of bottom plate 38, the cut out being of a rectangular shape.

Each vibrating means 22 includes a vibrating member 41 disposed at the lower part of storage section 21, between side plates 33, 34. Vibrating member 41 has a pivot mounted or swing plate 42, is elongated in the fore-and-aft direction and is disposed between side plates 33, 34. The swing plate is rotatably supported at its rear end by a shaft 43. A vibrating block 44 is carried on the front part of swing plate 42 and due to the swing capability of plate 42 can be pivoted into and out of storage section 21 through opening 40.

A supporting plate 45 is erected near one side of swing plate 42. Attached to this supporting plate is a cylindrical bearing tube 46, by which a rotatable shaft 48 is supported, bearings 47 being provided between the shaft 48 and bearing tube 46. One of the ends of shaft 48 is connected to the output of a motor unit 49 which serves as an actuator. Motor unit 49 has a case 50 attached to supporting plate 45. A motor 51 is mounted on the lower part of case 50, with a gear mechanism (not shown) for transmitting rotational driving force of motor 51 to rotational shaft 48, the gear mechanism being incorporated in case 50.

A guide member 52 extends down toward and is attached to swing plate 42 of vibrating member 41, at a location near the front end of the swing plate. A pair of parallel arranged guide plates 53, one above the other and projecting towards motor unit 49, are provided at the lower end of guide member 52. Further, a supporting shaft 54 is attached to the other end of rotatable shaft 48, at an eccentric position of shaft 48, and a roller 55 is rotatably attached to the end of supporting shaft 54 in such a manner as to be capable of rolling between upper and lower guide plates 53. Eccentric rotation of the roller 55 causing contact with plates 53 produces vibrations in the plate 41.

Figure 7:
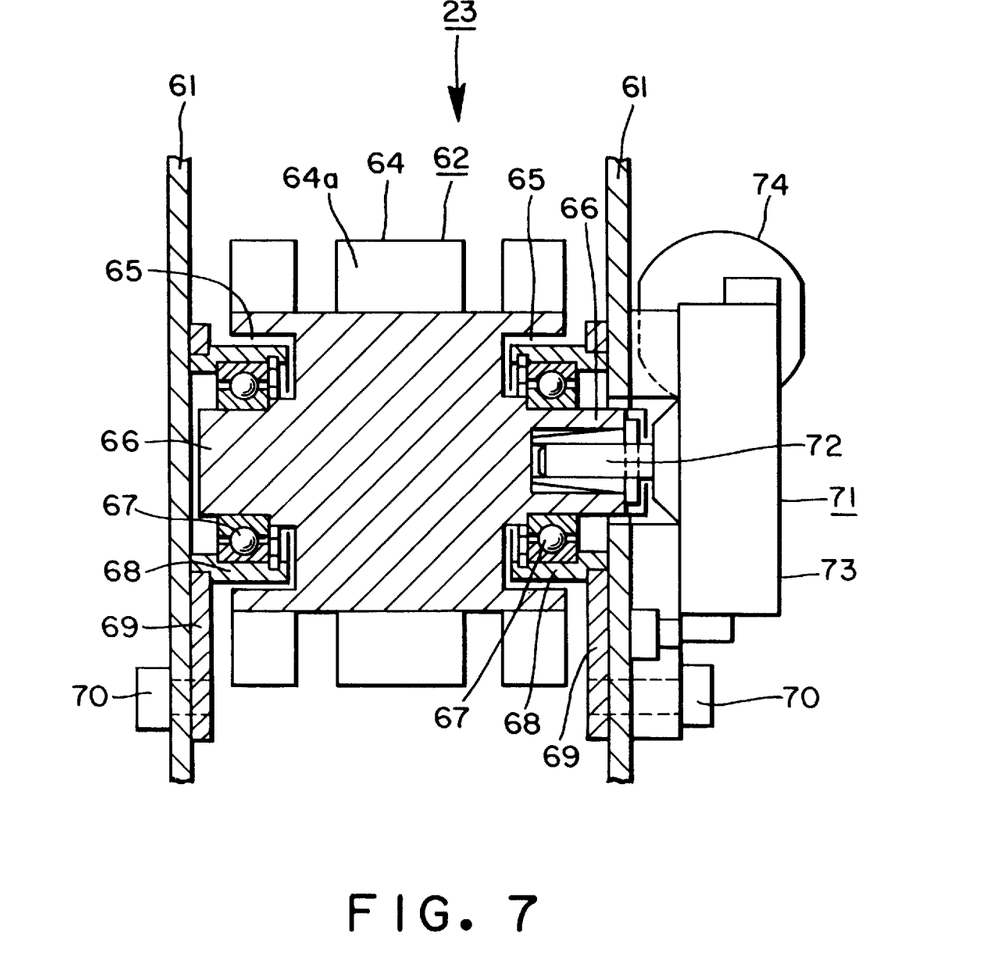
FIG. 7 is a sectional view of a discharge means carried in the storage section as taken along the line VII—VII in FIG. 6.

As shown in FIGS. 5 and 7, each discharge means 23 comprises a pair of side plates 61 extending parallel to each other and a rotatable discharging member 62 disposed between side plates 61. Discharging member 62 is provided at the periphery thereof, with four pushers 64, the pushers having indented portions 63 at a foreface of each for conformably receiving coin rolls C thereagainst. Each pusher 64 has and with respect to the pushing direction represented by an arrow in FIG. 5, a vertical leading face 64a and are respectively formed in a vertical face 64a and an inclined face trailing face 64b. Each pusher 64 can be comprised of three parts along its laterally extending axis.

Provided at each lateral end of discharge means 62 are an annular groove 65 and a shaft portion 66 surrounded by the annular groove. Bearing tubes 68 are mounted through bearings 67 around shaft portions 66, with the outer end of each bearing tube 68 being attached to a mounting plate 69 which is in contact with the inner surface of a side plate 61 and fixed thereto with a bolt 70.

The end of right shaft portion 66 of discharging member 62 projects outward of side plate 61, and a driving shaft 72 of a motor unit 71 is connected to this shaft portion 66. Motor unit 71 has a case 73 attached to side plate 61. Another motor 74 is mounted on case 73, with a gear mechanism (not shown) for transmitting rotational drive from motor 74 to driving shaft 72 being incorporated in case 73.

Vertical face 36b of guide plate 36 is provided with an aperture 81, so that a roller 82 serving as a rotational member can project through this aperture into storage section 21. Roller 82 is disposed such that its axis extends orthogonal to side plates 33, 34, the roller 82 being rotatably supported on a roller support 83. As seen in FIGS. 5 and 6, the axis B about which roller 82 rotates is parallel with a long axis D of the delivery port 32. A pair of threaded rods 84 project from the front end of roller support 83, and a mounting plate 85 is provided between side plates 33, 34 so that roller support 83 is secured by the threaded rods 84 to mounting plate 85 by means of nuts 86.

The roller 82 it is seen is above proximal delivery port 32 and it projects into the storage section. A cylindrical object passing down to the delivery port and in contact with the roller, traverses the roller outer surface in such way that the cylindrical object has generally horizontal translative movement away and toward the delivery port. Since that cylindrical object is in contact with other cylindrical objects, the same align or orient properly relative to the delivery port so that they readily can pass down and through the delivery port.

A guide member 87 for guiding coin rolls C discharged by discharging member 62 is provided at an upper front part of the space between side plates 61, and a chute 88 for guiding coin rolls C onto conveyor 24 is provided at a lower front part of the storage section in front of discharging member 62.

Sensors S1, S2 each comprising a photoelectric switch or the like and a sensor S3 comprising a proximity switch or the like are provided as shown in FIG. 4, sensor S1 being located below delivery port 32 in order to detect presence of a coin roll C which is received by indented portion 63 of discharging member 62. Sensor S2 is located above chute 88 in order to a detect coin roll C which is discharged by discharging member 62, and sensor S3 provided in order to detect the standard position of each indented portion 63 of discharging member 62, i.e., wherein an indented portion 63 faces directly downward. The respective standard positions of the four indented portions are located at 90 degree intervals.

Conveyor 24 is a belt conveyor rotated by a motor 91 (shown in FIG. 8) and, as shown in FIG. 3, has at both sides thereof a pair of guide rails 92 which are erected on the upper surface of the conveyor in order to prevent coin rolls C from rolling off or otherwise falling out of the conveyor.

As shown in FIG. 1, the aforementioned receiving section 25 is configured in shape of a hopper, and it receives coin rolls C discharging off conveyor 24 and from whence the received coin rolls are passed into a container 93, sack or other collection component.

Figure 8:
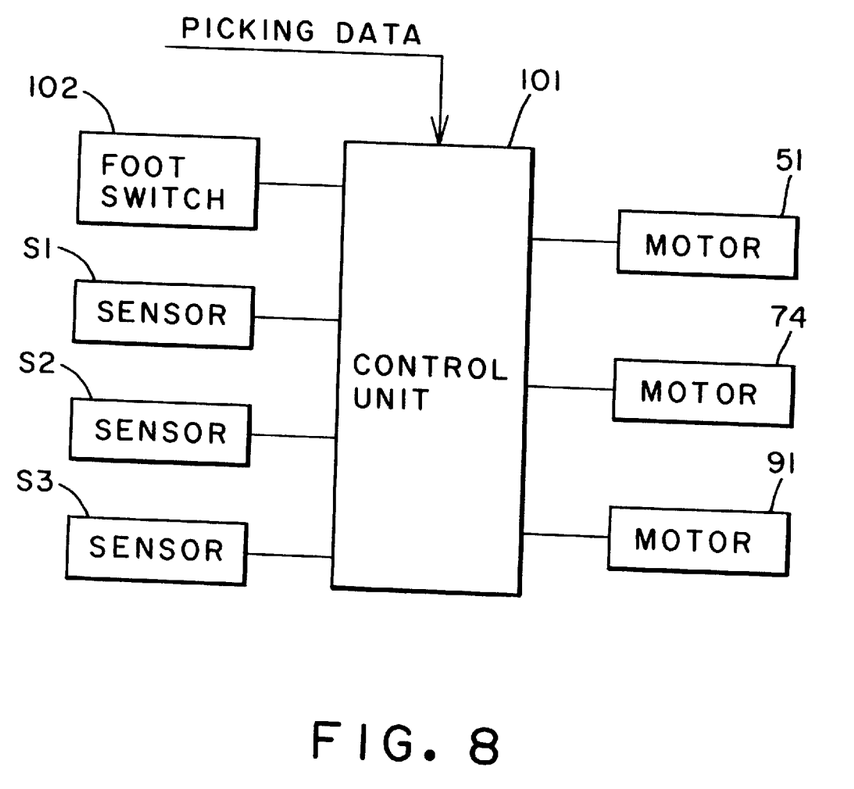
FIG. 8 is a block diagram of a control unit for controlling operation of the picking apparatus.

FIG. 8 depicts a control unit 101 for controlling the retrieving or picking apparatus, wherein sensors S2, S2 and S3, and motors 41, 74 for each storage section 21, as well as motor 91 of conveyor 24, are connected to control unit 101. Also, a foot switch 102 (shown in FIG. 2) disposed near receiving section 25 is connected to the control unit.

Control unit 101 controls the discharge means 23 of the respective storage sections 21 based on picking data which has been input from a computer or an input device and the like so that a desired number of respective denominations of coin rolls C necessary for each picking action are discharged.

The operation of the apparatus is described next.

When the apparatus is in a stand-by mode, the discharging member 62 of each storage section 21 is at the standard position as shown in FIG. 5, wherein one of the indented portions 63 is directly below delivery port 32, and one of coin rolls C of the stock of same in storage section 21 and of a denomination associated with a given storage section 21 locates in said indented portion 63, having fallen through delivery port 32. The orientation of discharging member 62 being at the standard position and a coin roll C being in indented portion 63 are detected by the respective sensors S1 and S2.

It will be understood that selected retrieval will have been inputted to the control unit and a container 93 will be disposed below receiving section 25. An operator then will press down foot switch 102 and action for retrieving coin roll C initiated. Also, the discharge means 23 and vibrating means 22 of each storage section 21 will be actuated.

The action of discharge means 23 causes discharging member 62 to rotate so that coin roll C in indented portion 63 is dropped by way of chute 88 onto conveyor 24, which is in the stand-by mode and not moving. When discharging member 62 rotates 90 degrees and reaches the next standard position, another coin roll C which has fallen through delivery port 32 comes to rest in the next indented portion 63. Discharge of coin roll C by discharging member 62 is detected by sensor S3.

In cases where a single coin roll C is sufficient, discharging member 62 is stopped at the standard position and returns to the stand-by state, waiting for the next discharge. Discharging member 62 can be rotated continuously or at intervals only in cases where sensor S1 has detected indented portion 63 of discharging member 62 receiving a coin roll C.

When vibrating means 22 is actuated, driving force of motor 51 rotates shaft 48, thereby eccentrically rotating roller 55 mounted thereon. As roller 55 is engaged with guide member 52, swing plate 42 of vibrating member 41 is caused to pivot vertically with supporting shaft 43 acting as the fulcrum so that vibration block 44 projects into and retracts out of storage section 21 through cutout portion 40. This projection and retraction of vibration block 44 causes coin rolls C located near delivery port 32 to be repeatedly moved up and down by vibration block 44. As coin rolls C are prevented from blocking delivery port 32, it is assured they orient properly so as to move to and into delivery port 32.

Roller 82 is so mounted on vertical surface 36b of guide plate 36 above delivery port 32 as to project from vertical surface 36b. Therefore, when discharge of a coin roll by discharge means 23 permits other coin rolls C in storage section 21 to move down towards delivery port 32, roller 82 causes coin rolls C which are located on vertical surface 36b to simultaneously move in the fore-and-aft direction. As coin rolls C in storage section 21 are prevented from assuming a blocking or tangling disposition in the storage section, they properly move the delivery port 32.

When a desired number of coin rolls C of the denomination corresponding to the picking data have been discharged, conveyor 24 heretofore at standstill, is actuated so that the coin rolls C are carried along by the conveyor and dropped through receiving section 25 into container 93.

With the storage sections 21 arranged along the conveying path of conveyor 24 in order from 500-yen coins through 10-yen coins to 1-yen coins, in other words in order from heaviest coins to lightest coins, heavy coin rolls C, such as 500-yen coins, will be placed in the bottom of container 93, while medium-weight coins (e.g. 10-yen coins) and light-weight coins (e.g. 1-yen coins) will be placed in the middle and upper parts of container 93. This not only stabilizes the coin roll load in container 93 but also prevents heavier coins from falling onto and damaging lighter coins.

Further, the embodiment described above may also be provided with a feeding device to facilitate supply of coin rolls C into storage sections 21 that are located at the upper part of main frame 11. Such a feeding device may comprises feeding sections which are mounted on the rear end of main frame 11 and contain coin rolls C to be supplied to respective storage sections 21, coin rolls C being carried upward to storage sections 21 by means of conveyors.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for retrieving cylindrically configured objects from a plurality of side by side arrayed hopper-shaped storage sections, each storage section containing cylindrical objects of an object denomination different than an object denomination of the cylindrical objects contained in any other of the storage sections, said apparatus comprising separate discharge means associated with each storage section for discharging cylindrical objects from said each storage section, said discharge means each being located at a lower part of its associated storage section and being operable to discharge cylindrical objects from its said associated storage section one at a time, a conveyor extending along the array of said storage sections adjacent the discharge means of each of said storage sections and operable to receive discharged cylindrical objects thereon for conveying said discharged cylindrical objects to a common location, and a control unit for controlling operation of respective ones of the discharge means for effecting discharge of a predetermined number of cylindrical objects in predetermined denominations from said storage sections, each storage section including a delivery port through which the objects pass on discharging from the storage section, said delivery port being located at a bottom of the storage section, a vibrating member mounted for movement wherein it extends into and retracts from the storage section through an opening in said storage section, and vibrating means operable to impart vibration to said vibrating member so as to cause movement of said vibrating member whereby during extension into and retraction from the storage section cylindrical objects in said storage section are shaken by contact of the vibrating member therewith.

2. Object retrieving apparatus in accordance with claim 1, in which each storage section includes a roller which is disposed above and proximal the delivery port and projecting into the storage section so that a cylindrical object passing downwardly toward the delivery port and coming into contact with an outer surface of said roller traverses said roller outer surface in travel that produces translative movement of the cylindrical object away and toward said delivery port in contact with other cylindrical objects proximate thereto thereby to assure that cylindrical objects passing to the delivery port are properly oriented to enter the said delivery port.

3. Object retrieving apparatus in accordance with claim 2 in which the rotary member rotates about a fixed axis which is parallel with a long axis of said delivery port.

4. Object retrieving apparatus in accordance with claim 1 in which each storage section discharge means comprises a drum disposed below said delivery port, said drum being supported to rotate such that a surface thereof passes adjacent said delivery port, there being indentation defining structure at said drum surface for reception therein of a cylindrical object which has passed through said delivery port.

5. Object retrieving apparatus apparatus in accordance with claim 4 in which the indentation defining structure at the surface of said drum is provided at plural spaced locations about said drum, said control unit being operable to position said drum with an indentation below said delivery port, said control unit including sensor means for detecting presence of a cylindrical object which has passed from the delivery port onto a drum indentation so that upon said detection, said control unit is operated to rotate the drum to a further positioning thereof in which the cylindrical object falls off the drum onto a chute which directs the cylindrical object onto said conveyor.

* * * * *